Aug. 11, 1964     J. R. L. SAINT PAUL     3,144,374

DEFORMABLE DRUM FOR THE MANUFACTURE OF TIRES

Filed Dec. 18, 1961

United States Patent Office 3,144,374
Patented Aug. 11, 1964

3,144,374
DEFORMABLE DRUM FOR THE MANUFACTURE OF TIRES
Jean Robert Louis Saint Paul, 17 Rue Jean Leclaire, Paris, France
Filed Dec. 18, 1961, Ser. No. 159,833
Claims priority, application France Dec. 19, 1960
4 Claims. (Cl. 156—416)

Drums for manufacturing outer covers for tires, constituted by two coaxial flanges between which is stretched a flexible tubular membrane which is inextensible in the axial or longitudinal direction, are already known.

In a first step in the manufacture of a tire, the flanges are apart and the membrane is stretched in such a way that it assumes a cylindrical shape on which the various elements of the tire carcass are applied. In a second step, the flanges are brought together and the membrane is inflated to take on a toroidal shape. The passage from the first step to the second corresponds to the shaping operation of the carcass of the outer cover.

In this type of drum it is noted, after admission of compressed air and moving of the flanges toward each other that the outside development of the membrane in an axial direction is frequently too small in relation to the carcass of the tire, whereby the carcass is not tensioned, and its deformation is inadequate.

The present invention has for an object to remedy the drawbacks of this type of drum. To this end, the invention consists in a drum of the aforementioned type, wherein the annular membrane is reinforced with longitudinal cables which are partially and elastically extensible, thus permitting, on the one hand, to impart to the membrane a cylindrical shape having sufficient rigidity for the manufacture of the carcass of the tire, when the membrane is stretched between the separated flanges of the drum, and, on the other hand, to give limited elongation to this membrane under the effect of the inflation pressure during the shaping operation, this elongation permitting the tension of the carcass of the tire to be increased.

The limited extensibility of the longitudinal cables of the membrane can be obtained, for example, by undulating the metal cables, or by using cables of synthetic wires or braids comprising a compressible or elastic central strand.

Figure 1:
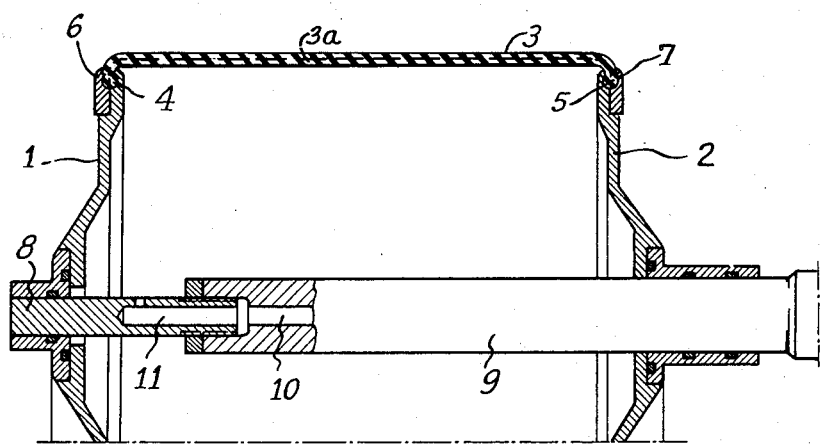
Figure 2:
Figure 3:
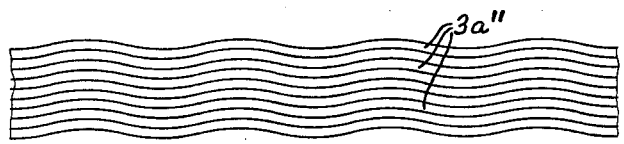
Figure 4:
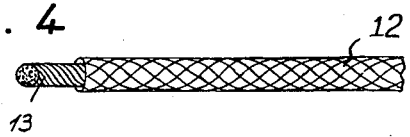
Figure 5:
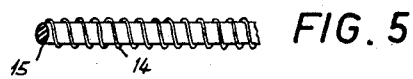

In order that the invention may be more clearly understood, reference will now be made to the accompanying drawings which show one specific embodiment thereof by way of example, and in which:

FIGURE 1 shows a partial view of the drum, in developed position, in cross section, FIG. 2 shows a metal cable which is undulated on a plane passing through the axis of the drum, FIGURE 3 shows in plan view, a layer of metal cables undulated in the plane of this layer, FIGURE 4 shows a cable constituted by a tubular braid and comprising a compressible or elastic central strand, and FIGURE 5 shows another form of a metal cable.

Referring to the drawings, the drum shown in FIGURE 1 comprises two lateral flanges 1, 2 on which an annular flexible rubber membrane 3 is secured. This fixing is obtained by the wedging of beads 4 and 5 provided at the extremities of the membrane by means of rings 6 and 7, suitably mounted on flanges 1 and 2.

The flange 1 is positively fixed to a shaft 8 which in turn is connected to a tubular shaft 9. The flange 2 can slide along this tubular shaft in order that it approach or draw away from flange 1. This approaching or separating movement of flange 2 can be obtained by any mechanical means acting on this flange or merely by the effect of the pressure of compressed air fed into the drum through conduit 10 of spindle 9 which extends at 11 into spindle 8. The latter is possible by virtue of the fact that tubular membrane 3 is reinforced with cables 3a which extend longitudinally of the membrane, i.e. parallel to the axis of rotation of the drum.

The drum described above could be modified without changing the invention in any way. For example, flanges 1 and 2 can be made simultaneously movable by means of suitable mechanims such as oppositely-threaded screws.

In all cases, the drum can take up two main positions, viz:

A position wherein flanges 1 and 2 are separated from one another in such a way that they stretch the membrane and give it a cylindrical shape to enable the various elements which will constitute the skeleton of the tire to be located;

A position wherein flanges 1 and 2 are brought together while compressed air is admitted to the interior in such a way that membrane 3 assumes a toroidal form in order to shape the carcass of the tire.

According to the invention, membrane 3 of this drum is reinforced, as mentioned above, with longitudinal cables 3a. These cables are partially extensible from the length corresponding to the cylindrical shape of the membrane.

This extension is initiated by the introduction of compressed air into the drum at the time of the shaping operation in such a way that when the membrane takes up a toroidal shape, its length, taken along its generatrices, is in excess of that which it had in cylindrical position.

This elongation of the membrane during shaping allows the tension exerted on the carcass of the tire to be increased and for it to take on sufficient deformation, but as this extension of the longitudinal cables of the membrane is limited, the elongation of the membrane stops at a predetermined point, in order that excess deformation of the carcass be avoided.

The limited extensibility of the longitudinal reinforcing cables of the membrane can be obtained in various ways which can be used separately or jointly with one another.

First of all, spring steel undulated metal cables can be used so that they once more take up their inital length before stretching.

These cables can be easily obtained by passing a "cord" fabric composed of parallel metal cable embedded in rubber between two corrugated rollers which gives the desired deformation to the metal cables of this "cord" fabric. If this fabric is used, the undulations of the metal cables will thus be located in shear planes to the drum. This embodiment comprises cables 3a' as shown in FIGURE 2.

Metal cables undulated in the other direction can also be used, that is to say that the undulations are included within the plane of the membrane. Such undulations can be obtained by passing a "cord" fabric of metal cables between two corrugated rollers as previously stated and in subsequently altering the undulations in such a way that they are placed within the plane of the fabric. This embodiment comprises cables 3a" as shown in FIGURE 3.

Braids 12 can also be used as the cables 3a, the braids being preferably of metal wires comprising a central strand 13 of a compressible material, for example textile (cotton, nylon or rayon) (FIGURE 4). Under the action of the tension, the braid tightens up on this central strand, this operation being accompanied by an increase in the length of braid. The elasticity is obtained in this case by using for example metal wires of spring steel to constitute the braid. Instead of using a textile central strand an elastic central strand of rubber made of a full or tubular cord, can be placed inside the tubular braid.

Another membrane reinforcing means consists in using mixed cables (FIGURE 5) obtained by rolling a metal cable wire 14 in a helix of joined or non-joined convolutions around a central strand of plastic material 15, of rubber or plastic material for example.

An additional elongation of the cables and the membrane which comprises them can be achieved by the various methods indicated above, of around 10%, which is sufficient to obtain good tension of the carcass of the tire during the shaping operation.

What I claim is:

1. A drum for building and shaping pneumatic tires adapted to be selectively disposed in a cylindrical and a toroidal configuration, the said drum comprising a shaft, two circular flanges supported coaxially in spaced relationship on said shaft for relative axial movement, a flexible tubular membrane disposed coaxially of said shaft and extending between said flanges, means securing the edges of said membrane to said flanges, a plurality of reinforcing cables in said membrane each extending generally axially of the membrane between said securing means, said cables each having a limited elastic extensibility in the direction of its length of an amount in the order of 10% of its initial length, and means for introducing air under pressure into the region enclosed by said membrane and flanges when the latter are moved toward each other to thereby dispose the said membrane in a toroidal shape with an increase in the length of the membrane by an amount determined by the extent of extensibility of said cables.

2. A drum for building and shaping pneumatic tires as defined in claim 1 wherein the said cables are metallic and the elastic extensibility thereof is provided by undulations in the cables along their lengths.

3. A drum for building and shaping pneumatic tires as defined in claim 1 wherein the said cables each comprises a central strand of yieldable material surrounded by a tubular braid of wire.

4. A drum for building and shaping pneumatic tires wherein the said cables each comprise a central strand of plastic material about which at least one metallic wire is helically wound.

References Cited in the file of this patent

UNITED STATES PATENTS

| | | |
|---|---|---|
| 2,084,009 | Sohl | June 15, 1937 |
| 2,241,125 | Girard | May 6, 1941 |
| 2,312,587 | Price | Mar. 2, 1943 |
| 2,986,196 | Frazier | May 30, 1961 |
| 3,035,629 | Vanzo et al. | May 22, 1962 |
| 3,101,289 | Giletta et al. | Aug. 20, 1963 |